US009369171B2

(12) United States Patent
Diamond et al.

(10) Patent No.: US 9,369,171 B2
(45) Date of Patent: Jun. 14, 2016

(54) MULTI-STANDARD IN BUILDING MOBILE RADIO ACCESS NETWORK

(71) Applicant: KEY 2 MOBILE LLC, Thousand Oaks, CA (US)

(72) Inventors: Patrick A Diamond, Temecula, CA (US); Anthony Giraudo, Thousand Oaks, CA (US); Lloyd Linder, Agoura Hills, CA (US)

(73) Assignee: Key2Mobile LLC, Thousand Oaks, CA (US)

( * ) Notice: Subject to any disclaimer, the term of this patent is extended or adjusted under 35 U.S.C. 154(b) by 575 days.

(21) Appl. No.: 13/866,827

(22) Filed: Apr. 19, 2013

(65) Prior Publication Data

US 2014/0313984 A1    Oct. 23, 2014

(51) Int. Cl.
*H04W 4/00*      (2009.01)
*H04B 1/40*      (2015.01)
*H04L 12/723*    (2013.01)

(52) U.S. Cl.
CPC .. *H04B 1/40* (2013.01); *H04L 45/50* (2013.01)

(58) Field of Classification Search
USPC ......... 370/223–338, 352–356, 389–401, 343; 709/223–245, 201
See application file for complete search history.

(56) References Cited

U.S. PATENT DOCUMENTS

| | | | | |
|---|---|---|---|---|
| 6,205,133 B1 * | 3/2001 | Bexten | ............... | H04B 1/0007 370/343 |
| 6,941,380 B2 * | 9/2005 | Cunningham | ........ | H04L 12/462 370/229 |
| 7,263,597 B2 * | 8/2007 | Everdell | ............... | H04L 47/125 709/201 |
| 7,426,210 B1 * | 9/2008 | Miles | .................. | H04J 14/0223 370/400 |
| 7,483,411 B2 * | 1/2009 | Weinstein | ............... | H04L 63/08 370/338 |
| 7,764,700 B2 * | 7/2010 | Muirhead | ........... | H04L 12/4641 370/395.21 |
| 8,194,554 B2 * | 6/2012 | Bragg | .................... | H04L 12/413 370/241 |
| 8,638,764 B2 * | 1/2014 | Zhang | .................... | H04W 88/12 370/310.1 |
| 8,842,657 B2 * | 9/2014 | Walton | .................... | H04L 12/66 370/348 |
| 2008/0186874 A2 * | 8/2008 | Tamboise | ................ | H04L 41/08 370/254 |
| 2009/0109979 A1 * | 4/2009 | Tong | ..................... | H04W 92/02 370/397 |
| 2009/0274202 A1 | 11/2009 | Hanke et al. | | |
| 2010/0093359 A1 * | 4/2010 | Gallagher | ............. | H04W 16/32 455/445 |
| 2011/0038337 A1 | 2/2011 | Gallagher et al. | | |

* cited by examiner

*Primary Examiner* — Man Phan
(74) *Attorney, Agent, or Firm* — Fitzsimmons IP Law (57) ABSTRACT

A multi-standard indoor mobile radio access network is provided. Preferred embodiments of the present invention operate in accordance with a plurality of radio heads and at least one gateway/router. In one embodiment of the present invention, each radio head is configured to use a signal received from a wireless device to detect a corresponding service provider. Each radio is also configured to detect a power level of the signal, as received. Data is then communicated to the gateway/router, including at least radio head identification numbers, z-axis information (e.g., as stored in each radio head, etc.), the channels used, service provider identifiers, and power levels (e.g., as received by each radio head). The gateway/router is then configured to use at least the power levels and z-axis information provided by the plurality of radio heads to determine a location (e.g., z-axis location, or floor) of the wireless device.

22 Claims, 10 Drawing Sheets

MULTI-STANDARD IN BUILDING MOBILE RADIO ACCESS NETWORK

RELATED APPLICATIONS DATA

This application claims priority pursuant to 35 U.S.C. §119(e) to U.S. provisional patent application Ser. No. 61/636,286, filed Apr. 20, 2012, the subject matter of which is incorporated by reference herein in its entirety.

BACKGROUND OF THE INVENTION

1. Field of the Invention

The present invention relates to indoor mobile radio access networks, and more particularly to an indoor mobile radio access network with the capability to adaptively detect and communicate with devices utilizing different service providers and communications protocols. The indoor mobile radio access network can communicate with the different service providers over standard protocols to allow relatively easy integration into existing macro networks.

2. Description of Related Art

Mobile services providers use several techniques known in the art to provide licensed spectrum service in areas of dense population and areas with large signal degradation due to the presence of physical structures such as large buildings. These techniques include the use of femtocells, picocells, or Distributed Antenna Systems ("DAS") to extend licensed spectrum networks in these environments.

Femtocells provide a highly localized service area and are capable of supporting a small number of users (typically 4-8). Each femtocell connects to broadband internet connections to communicate with a provider's core network. Because each femtocell supports only a small number of users, many femtocells are required to adequately serve a larger number of users. The use of broadband internet means that each femtocell adds additional demand to the network resources of a particular location. Furthermore, femtocells are generally specific to a single wireless carrier, leaving many users without service despite femtocell deployment.

Picocells operate in a similar way to femtocells, but provide access to a greater number of users per cell, allowing for a reduced number of installations to cover a greater number of users.

Distributed Array Antennas or Distributed Antenna Systems ("DAS") take a different approach to solving the problem of indoor network service. A coaxial cable or fiber optic cable runs from the macro-network base antenna to an antenna element within the building providing an RF analog connection to the macro-network within a building. Since only one antenna or small antenna array is needed to serve the building, some of the deployment problems associated with femtocells and picocells are eliminated. However, since each distributed antenna requires a new coaxial cable or fiber optic line run and installation within the building, the cost of the added infrastructure needed for wide distribution can become prohibitive. Also, the signals obtained in analog form still require processing at the base station so the DAS solution does not address the user load problems also associated with high density areas. In fact, the problem is compounded by adding additional users for the macro-network to process that previously did not have service.

Existing networks suffer performance degradation for users in densely populated areas. Bandwidth limits of individual macro-network base stations and signal degradation due to materials and proximity of large buildings are the two primary causes. These problems have led wireless providers to seek alternative solutions for providing licensed spectrum access to users. It would be useful to have a radio access network solution for high population density areas with closely situated large structures that offers improved service to users, removes load from existing macro-networks, concurrently operates within existing and future communications standards, requires minimal additional infrastructure to deploy, and does not interfere with the existing macro-network.

SUMMARY OF THE INVENTION

The present invention provides a multi-standard indoor mobile radio access network by utilizing existing building infrastructure coupled with Ingress/Egress detection, configurable radio heads, radio synchronization technology, interface gateways, and Multiprotocol Label Switching (MPLS) routers to integrate with existing macro-networks.

In a first embodiment of the present invention, the core architecture of a mobile radio access network includes a plurality of radio heads, wherein each radio head provides a wideband analog front end to a network. Each radio head also performs base band processing and digitization, and is connected to existing wiring in a building (e.g., Ethernet wiring, etc.). The wiring directly connects between each radio head and an interface gateway. The interface gateway is responsible for directing and receiving communication from each of the service providers. The interface gateway transmits data through an MPLS Router, which has a label based link to each service provider's small cell gateway. After processing the data from each radio head channel by the interface gateway, service provider networks will view the data as if they are communicating with a dense cluster of femtocells. This is possible because the interface gateway aggregates the information from many radio heads, which serve multiple services providers, and directs them to each service provider individually.

The ability to achieve a high number of simultaneous channels in radio heads requires optimization of the amount of transmitted information. This can be achieved, for example, by using customized data packets that can be quickly processed to maximize throughput. The format of these data packets is programmable in both the radio heads and the interface gateway and as a result can be customized for a particular building. For example, each time a radio head sends data to the interface gateway, a header packet may include at least a radio head identification number (e.g., a unique identifier), location information (such as x-axis information (e.g., latitude, etc.), y-axis information (e.g., longitude, etc.), z-axis information (e.g., floor, elevation, altitude, etc.), etc.), the channel used, and a service provider identifier (e.g., the service provider of the wireless device in communication with the radio head). Since there are a finite number of service providers, this information can be encoded using a three-bit or four-bit number rather than an ASCII string or other large data format the provider itself uses as identification. The goal of using such packets is to allow processing of radio head data through efficient use of the available processing power in an interface gateway. The radio head will effectively be able to decode information by looking up associated values in a table or memory location.

In one embodiment of the present invention, each radio head transceiver includes a plurality of preselect filters, wherein each filter is tuned to a particular service or communications standard, a plurality of low noise amplifiers (LNAs), a plurality of RF down-converter, at least one analog-to-digital converter, at least one digital receive tuner/filter and a software defined radio (SDR) digital modem. Each LNA and down-converter can be wide-band, or tuned to a particular band or service. The digital receive tuner/filter can be incorporated into a single/multiple FPGAs, or a single custom ASIC. The modem is software programmable, and it will support multiple cellular services, and is reconfigurable through software. The modem supports existing 3G/4G protocols, and can also be programmed to support future protocols. The modem resultantly can support multiple protocols, multiple simultaneous carriers, and multiple modulation standards.

When the network detects users within the receiver range of the radio head, it then uses frequency and modulation characteristics of a device signal to determine a device's communication protocol. For example, in communications standards where users are allocated a small amount of bandwidth, the transmission frequency is indicative of both the service provider and communications protocol of the signal because each provider has licensed their own spectrum. However, in protocols like Code Division Multiple Access ("CDMA") where a broader spectrum is shared, a different technique such as reading carrier information from the unencrypted header of communicated data containing service provider identification can be used. This information is used to configure an appropriate transmit and receive channel in the SDR software for communication with the device. Because of this adaptability, the radio head acts as a ubiquitous transceiver for different service providers and communications protocols that is transparent to the user. This overcomes a significant disadvantage present in femtocells, picocells, and DAS systems that are provider specific.

Using an ingress and egress detection method the detection process begins as soon as a user enters a building. When the signal from the macro-network begins to attenuate, mobile devices increase their transmission power in order to maintain connection to the network. When this occurs, a sally port receiver detects the connection protocol and service provider of the device. This information is shared with the rest of the radio network, possibly in a table within the interface gateway. The interface gateway can determine whether the radio access network has available channels capable of handling the new user. The network can either reallocate idle resources to the user's protocol or place the user in a queue if none are available. If a channel is available, the appropriate radio heads establish a communication block within the SDR capable of handling the user. The mobile radio access network then communicates with the provider network to negotiate handoff of the user. At the same time the interface gateway coordinates with the radio heads to reallocate resources as needed for other users. Similarly, when a device user is connected to the mobile radio access network and begins exiting from the sally port, the mobile radio access network can begin negotiating handoff of the user back to the macro-network. Protocol detection in combination with the interaction between the interface gateway and the macro-networks allows for a seamless user experience during both ingress and egress.

Once they device user is detected, a user location detection function can be implemented within the radio access network, wherein the radio heads are used to determine mobile device and user location. The received power level from a particular mobile device is measured by a plurality of radio heads (e.g., at least two different radio heads, etc.). Since the absolute transmitted power by the mobile device is unknown, the relative received signal strength at the radio heads are compared and the location of the mobile device can be estimated based on the relative distances from the radio heads. Alternatively, or additionally, a "time of arrival" approach can be used to locate the position of a mobile device. In this layout, radio heads will look for a special signal or signal feature and create a timestamp of the signal feature arrival. Using the travel time of signals traveling through air at approximately 1 ns/ft over a distance between the device and the radio head, the relative position of the device is determined. In order for this method to be accurate, synchronization of the radio head timing is needed. Problems with the synchronization can also be determined by the use of additional radio heads. The position of the radio heads could potentially be programmed during radio head installation for maximum accuracy, but these techniques can also be applied for the radio heads to determine their own relative positions. For example, sensors can monitor the transmission from the radio head(s). This extra capability would allow the location measurements to remain accurate even if the radio heads are moved from the manually entered positions at installation.

These location methods are possible because of the aggregation of radio head data by the interface. A system of independent femtocells would be poorly suited to provide similar functionality because femtocells are designed to communicate directly with the service provider network. The scale of a large mobile network would make implementing this type of functionality remotely unwieldy and expensive because the network would need to know the physical location of each femtocell. Having radio head data that includes location information and including an interface gateway to manage this data reduces the task of device location to an achievable scale.

It should be noted that the location information provided does not only give latitude and longitude coordinates for each mobile device. The radio heads have floor information, allowing a user to be even more precisely located by including information about their altitude. This information is particularly useful when an emergency "911" phone call is made and the caller is unable to convey their exact location. The exact location information could be conveyed directly to emergency responders by remotely accessing the interface gateway data at a building security computer terminal. Also, it would not be difficult for a mobile service to gather the additional altitude or floor information in addition to other location information which would be relayed to emergency responders directly.

A more complete understanding of a multi-standard indoor mobile radio access network will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

An embodiment of the present invention includes an apparatus and method for providing a multi-standard indoor mobile radio access network by utilizing existing building infrastructure coupled with Ingress/Egress detection, configurable radio heads, radio synchronization technology, interface gateways, and Multiprotocol Label Switching ("MPLS") to integrate with existing macro-networks.

Figure 1:
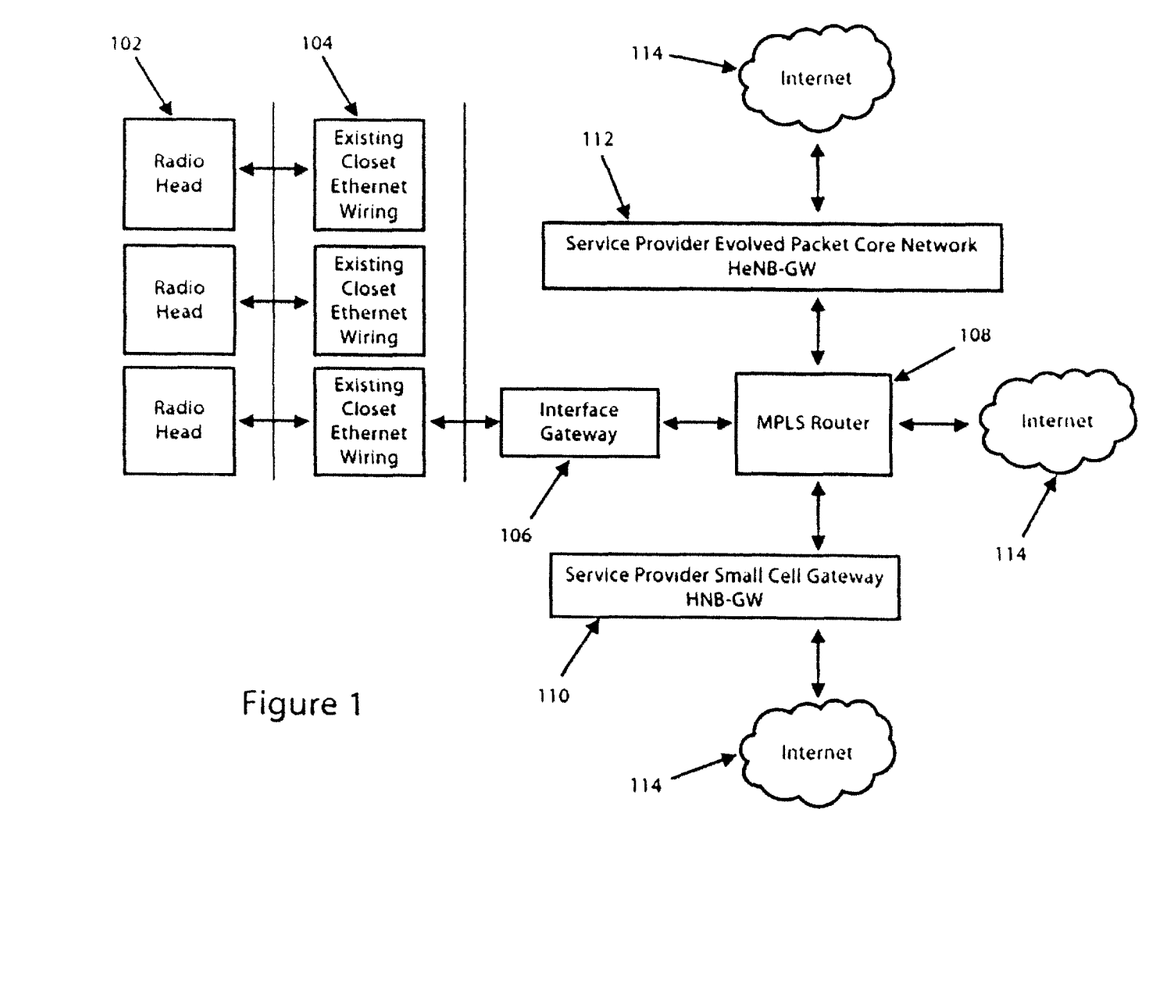
FIG. 1 depicts the system architecture of a mobile radio access network in accordance with an embodiment of the present invention.

FIG. 1 shows the core architecture of a mobile radio access network in accordance with an embodiment of the present invention. Radio Heads 102 provide a wideband analog front end to the network. The radio head also performs base band processing and digitization. Each radio head is connected into the existing closet Ethernet wiring 104 of a building. In particular, buildings conforming to the TIA/EIA 568 structured cabling systems standards will allow a uniform and repeatable installation process. The cables directly connect between each radio head and the interface gateway 106. The interface gateway is responsible for directing and receiving communication from each of the service providers. The interface gateway transmits data through the MPLS Router 108 which has a label based link to each service provider's small cell gateway (HNB-GW) 110 or evolved packet core gateway (HeNB-GW) 112. Unlike broadband internet routing, the list of data endpoints for this system is a known list of service providers which means complex routing table lookups are unnecessary. After processing the data from each radio head channel by the interface gateway, service provider networks will view the data as if they are communicating with a dense cluster of femtocells. This is possible because the interface gateway aggregates the information from many radio heads, which serve multiple services providers, and directs them to each service provider individually.

Data is ultimately routed to the service provider's macro-network at a Home NodeB Gateway (HNB-GW) for 3G or Home eNodeB Gateway (HeNB-GW) for LTE 816. These gateways are currently used in macro-networks for interfacing with femtocell radio network implementations. This means that this radio access network can appear to the macro-network as either a large collection of 3G femtocells or as an LTE eNodeB base station. By using this type of interface, no new protocols are needed to handle the handoff of callers, and the radio access network can be easily integrated into the existing macro-network infrastructure. Alternatively, if a particular service provider prefers not to see the radio access network as a collection of femtocells, the interface gateway has the capability of being programmed to communicate using a different preferred protocol. The interface gateway and MPLS devices can be located in a building basement where the existing closet Ethernet wiring 104 brings all of the radio head output cables to the location of a building's main Ethernet access area. Both Internet connections and telephone communications come through the service provider gateways 110 and/or 112 in current cell network architectures. However, selected IP traffic can be routed directly from the MPLS Router 108 to the internet 114 without traversing the service provider gateway 110 and/or 112. This technique is referred to as selected IP traffic offload (SIPTO) and there is work underway in the standards bodies to standardize this protocol. The intent of the SIPTO protocol is to allow for some internet communication to be offloaded from the service provider's core network and instead provide a direct connection to the Internet 114 that does not utilize the HNB-GW and/or HeNB-GW. An embodiment of the present invention where the internet data connection is offloaded from the macro-network and comes directly from a broadband internet connection 114, for example, is also within the scope and spirit of this invention.

Figure 2:
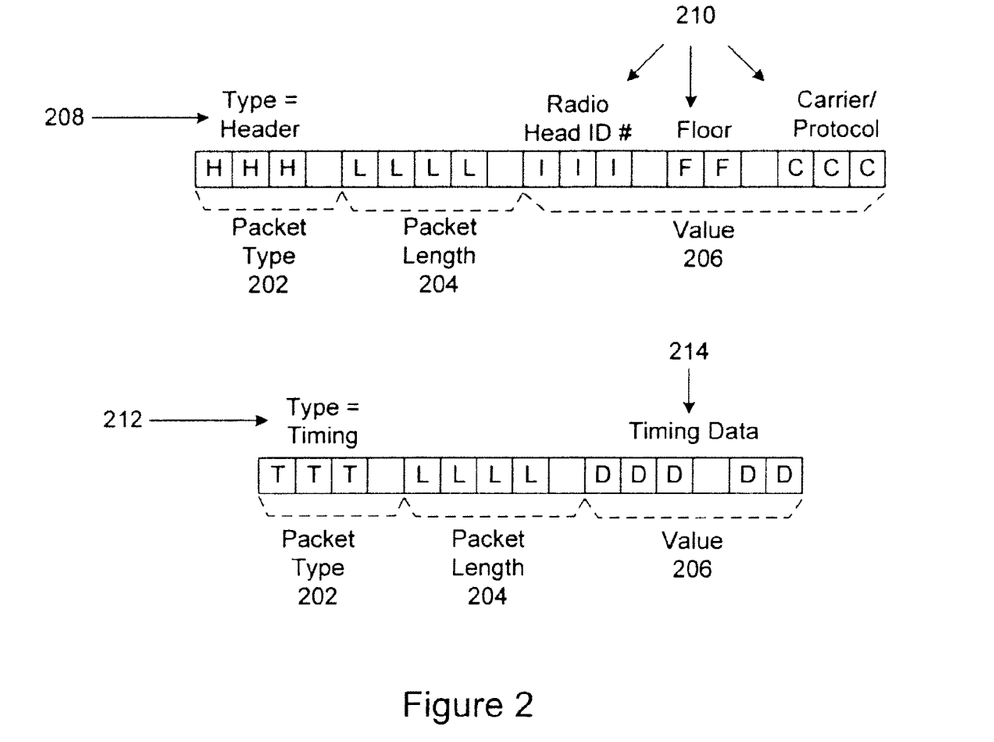
FIG. 2 depicts exemplary packets using optimized data encapsulation for communication between radio heads and the interface gateway.

The ability to achieve a high number of simultaneous channels in radio heads requires optimization of the amount of transmitted information. FIG. 2 illustrates an implementation of data encapsulation in accordance with an embodiment of the present invention. Because the communication between radio heads and the interface gateway is completely internal to the building, communication takes place over a layer 2 encapsulation method reducing the overhead associated with data that transmits over Internet Protocol. Key data is reduced into customized data packets that can be quickly processed to maximize throughput. The format of these data packets is programmable in both the radio heads and the interface gateway and as a result can be customized for a particular building. For example, each time a radio head sends data to the interface gateway, a header packet includes a radio head identification number, a floor number, the channel used, and a service provider identifier. Since there are a finite number of service providers, this information can be encoded using a three-bit or four-bit number rather than an ASCII string or other large data format the provider itself uses as identification. The goal of the data encapsulation is to allow efficient processing of radio head data through efficient use of the available processing power in an interface gateway. The radio head will effectively be able to decode information by looking up associated values in a table or memory location. While a specific set of data types and information has been described, one skilled in the art will recognize that size reducing encapsulation of other key pieces of information relevant to any of the functions of the mobile radio access network fall within the scope and spirit of the present invention.

For proper operation the radio heads and interface gateway must be properly synchronized in both time (phase) and frequency. Timing information is conveyed using timing over packet technology, which can be based on the IEEE 1588 protocol, also known as Precision Timing Protocol, or based on NTP (Network Timing Protocol). Since the communication between the radio heads and the interface gateway is internal to the system, the message set for the chosen protocol can be optimized for limiting bandwidth usage.

Figure 3A:
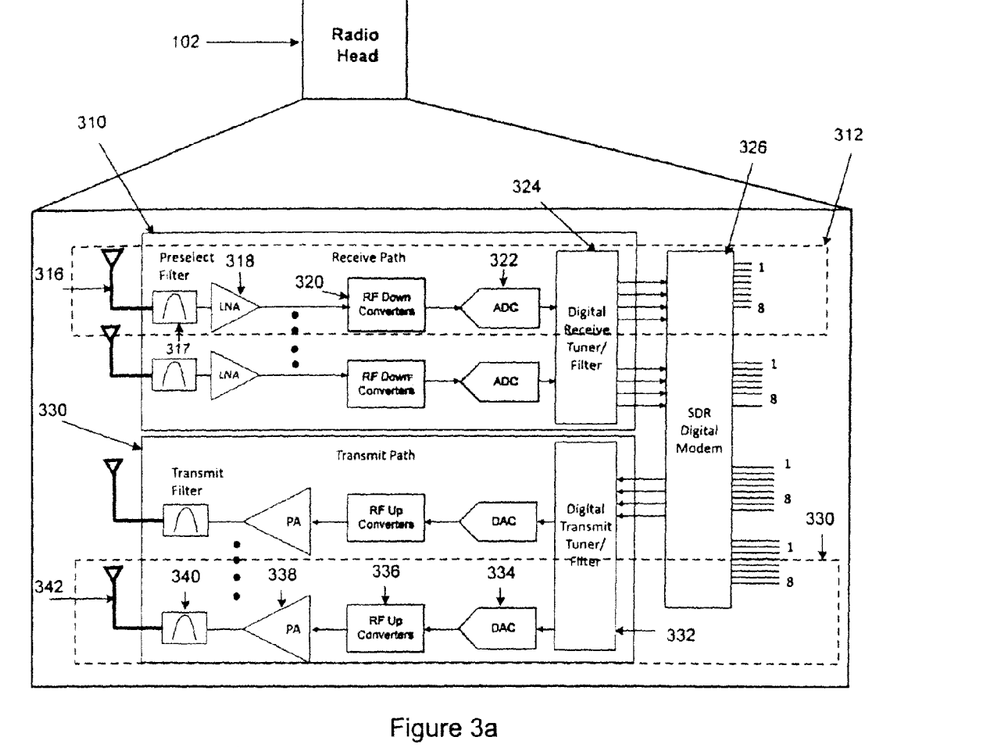
FIGS. 3a and 3b depict the architecture of a radio head in accordance with an embodiment of the present invention.

FIG. 3a is an embodiment of a channelized approach to a radio head transceiver in accordance with the present invention. A preselect filter 317 is tuned to a particular service or communications standard. The LNA 318 and down-converter 320 can be wide-band, or tuned to a particular band or service. Component selection is based on cost, power, performance, and availability. The down-converted signal is digitized by an ADC 322 that is optimized for a specific service. For a multi-channel receiver, there can be different LNAs, down-converters, and ADCs, with each component optimized for a particular service. The maximum bandwidth of the receiver in support of existing services is on the order of 10-20 MHz. Thus, for existing services, for a channelized receiver approach, the maximum required ADC sample rate is >40

MSPS. However, future protocols operate with increased bandwidth, such as 100 MHz of instantaneous bandwidth for LTE. For considerations of compatibility a channel may be optimized for a future service and appropriate components selected for the design of that channel. The digital receive tuner/filter 324 can be incorporated into a single/multiple FPGAs, or a single custom ASIC. This decision is driven by a number of design considerations. The output of the tuner will drive the software defined radio ("SDR") digital modem 326. The modem is software programmable, and it will support multiple cellular services, and is reconfigurable through software. The modem supports existing 3G/4G protocols, and can also be programmed to support future protocols. The modem resultantly can support multiple protocols, multiple simultaneous carriers, and multiple modulation standards.

The transmit path is the corollary of the receive path. A DAC 334 will produce the required modulated waveform, over the required instantaneous bandwidth, for a given cellular standard, as described above for the receive path. Each DAC will drive an up-converter 336 which will then drive a tuned RF Power Amplifier 338 ("PA"). The PA will be tuned for a particular service. The PA will not be required to be non-standard, or support multi-band, multi-mode transmit, unless components are available, and it is the technically correct solution. The typical solution will have the PA drive a service bandwidth filter 340 and the transmit antenna 342. All 3G/4G/Wi-Fi protocols are supported on the receive and transmit paths. All service providers/carriers will resultantly be supported by the same equipment.

In another embodiment of the present invention shown in FIG. 3a, the RF down converter 320 and ADC 322 can be replaced with an RF-sampling ADC. As long as the instantaneous bandwidth of the input signal is not greater than one half of the ADC sampling rate (Nyquist), the input bandwidth will be aliased into the first Nyquist region of the ADC. Presently, data converter products exist in the marketplace that can support this type of operation for existing communications protocols. This design choice can simplify the receiver front end by eliminating the down-converter components as well as the associated LO signal generation hardware (PLLs). Similarly, the DAC 334 and RF up converter 336 can be replaced with an RF DAC. There are currently DAC components available that directly synthesize RF waveforms without suffering the classical sin(x)/x gain roll-off of classical DACs in the second, third, etc. Nyquist regions. These DACs effectively directly synthesize RF bands that are centered around the center frequency of the RF carrier. Resultantly, there is no need for the up-converter hardware or the associated LO signal generation hardware. RF DAC and ADC performance is expected to continue to improve.

Figure 3B:
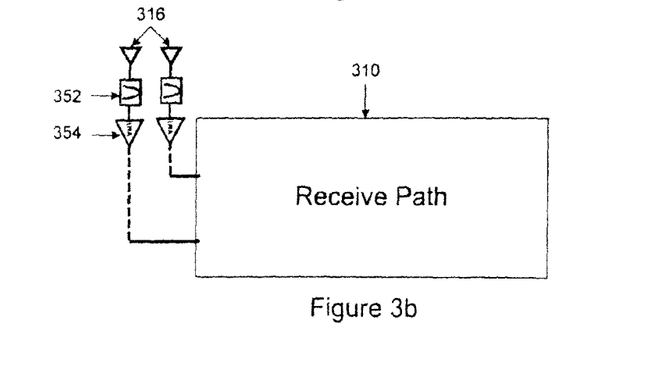

FIG. 3b depicts an embodiment of the present invention where distributed antennas are used for a single service or a set of distributed antennas is used for multiple services. Equivalently to a standard DAS system, distributed antennas 316 and LNAs 352 can be located across the floor of a building. This type of LNA is equivalent to the LNA that is located toward the top of a standard cellular tower that drives a long piece of coaxial cable to the base station. This component is typically called an antenna LNA. These LNAs can drive a long coaxial cable back to the radio head, which also has additional local LNAs (318 in FIG. 3a) in order to properly meet the sensitivity requirements for the receiver. This approach can be used for analog or digital beam-forming to enhance the sensitivity of the received channel for a particular service. The beam forming can be tailored to specific functions of the radio access network and building structure features as described below. The techniques and algorithms for beam-forming are well known to those skilled in the art. The distributed antenna system can provide superior performance to a single channel receiver. This approach is typically used in MIMO systems as well as military and, now, automotive radar. Additionally, the distributed antenna system can also be used to provide additional coverage of a given carrier service, or multiple carrier services, in a given area, without the need to replicate the entire radio head architecture of FIG. 3a, saving hardware and cost.

Figure 4:
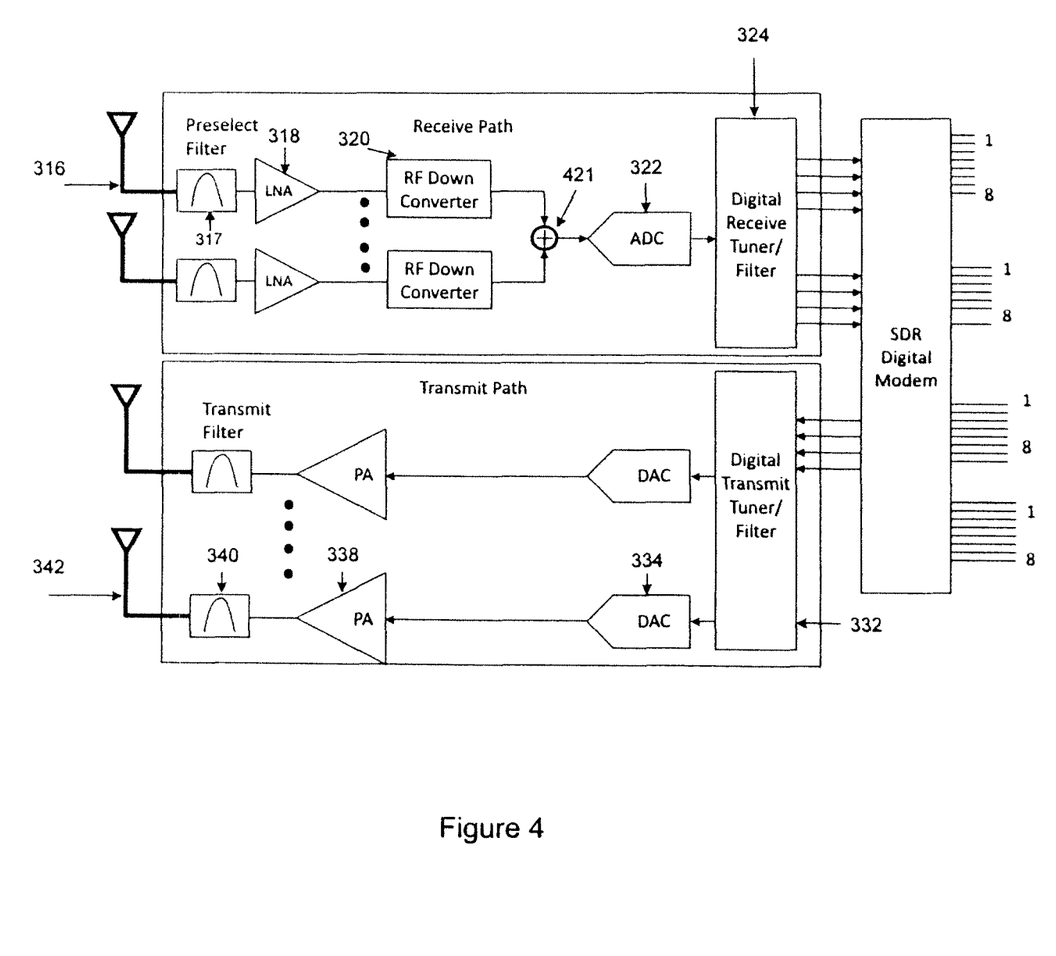
FIG. 4 depicts the internal architecture of a radio head in accordance with the present invention with a channel sharing receiver.

FIG. 4 depicts a radio transceiver in accordance with the present invention that shares the same hardware for multiple services. In this approach, a wide-band ADC 322 is used. Each receiver channel's Local Oscillator ("LO"), which drives an RF down-converter 320, is selected such that at base band there are multiple receive channels appropriately offset in frequency with the Nyquist bandwidth of the ADC (See FIG. 5). A base band summing amplifier 421, for example, can sum all of the receive channels, and the summation is digitized by a single ADC 322. The summed service bandwidths are designed such that they collectively do not violate the Nyquist criterion, and the link budgets must be properly considered to prevent the summed power from saturating the ADC. For this approach, hardware is saved over the architectural approach given in FIG. 3a.

Figure 5:
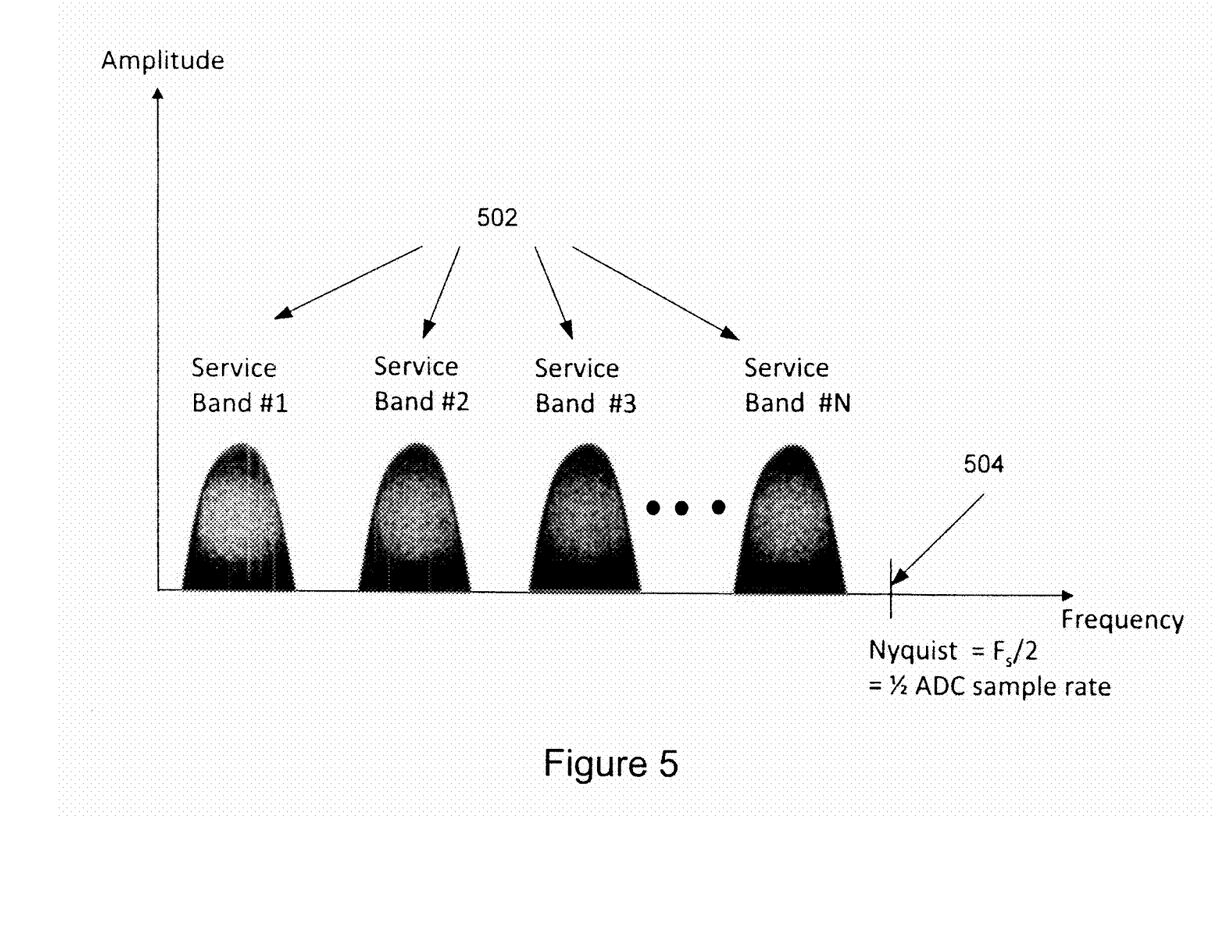
FIG. 5 depicts a graphical depiction of the frequency spectrum below the ADC Nyquist frequency shared by multiple input signals.

The concept of the appropriate signal bandwidths resulting from the summation by the summation amplifier 421 is shown in FIG. 5. In FIG. 5 multiple RF front ends use different LO frequencies to selectively place the down-converted input signal service band into a designated portion of the input spectrum 502 of the ADC. The bands can be placed so that they do not mutually interfere, while all falling within the first Nyquist region of the ADC 504. This allows a single ADC to convert the bandwidths for multiple front end inputs simultaneously.

Figure 6A:
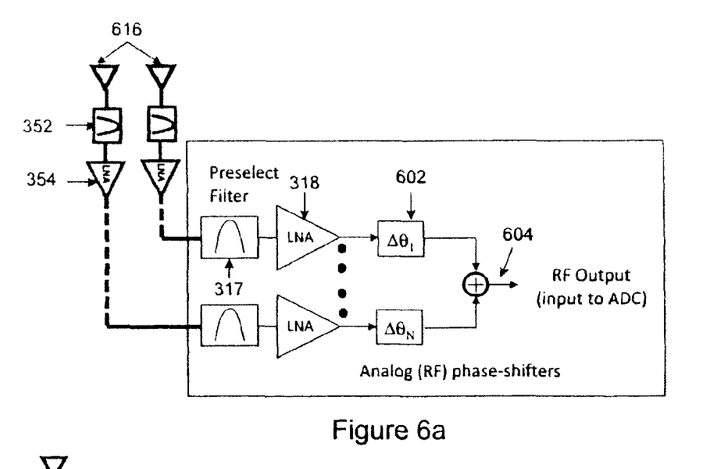
FIGS. 6a and 6b depict receiver and transmitter beam forming architectures utilizing phase shifting techniques.

FIG. 6a depicts an approach to beam-forming in the a radio access network receiver. In this approach there are multiple antennas for the same service 616. The received signals are phase shifted in the RF domain through a digitally programmable phase shifter 602. The summed RF output 604 can continue to be down-converted through normal down-converter hardware (See FIG. 3a) or direct RF sampled (See FIG. 3a description). This technique can be taken advantage of for multiple services. The beamforming approach also helps to reduce the hardware needed to support the overall radio access network by increasing the area effectively serviced by a single radio head. The benefits of this architecture are well documented, and those skilled in the art can appreciate the benefits from a performance perspective, as well as a cost perspective. It should be noted that the phase shifted outputs in FIG. 6a do not have to be summed after shifting, as shown in FIG. 6a. The phase shifted outputs can also go through conventional down-converter paths and be summed in the digital domain. Also, it is possible to digitize each LNA 318 output individually and perform a digital phase shift 602. The digital phase shift approach may not be desirable because of the additionally required hardware. One skilled in the art will recognize that trade-offs in design requirements will influence the final architecture.

Figure 6B:
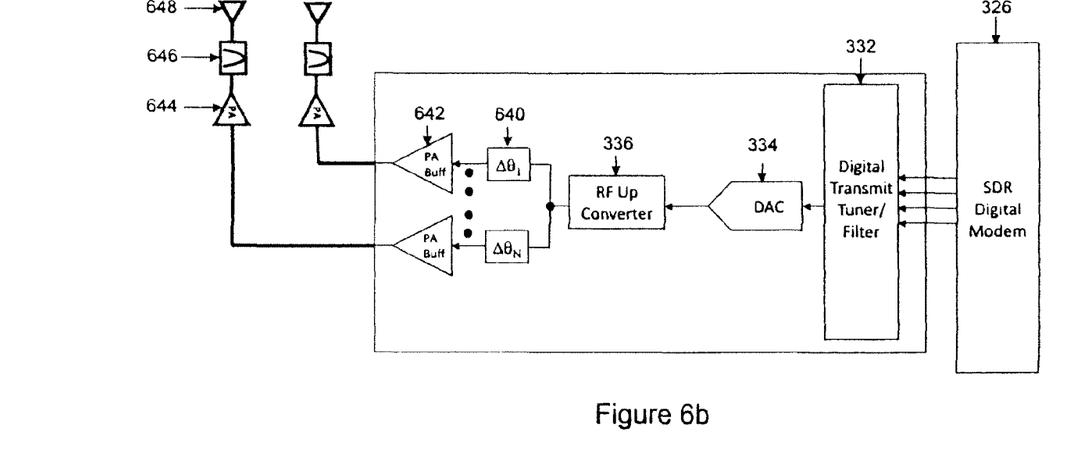

FIG. 6b depicts a corresponding beam-forming transmitter capable of communicating with the receiver depicted in FIG. 6a. This architecture is merely one possible embodiment of a beam-forming transmitter architecture for a radio head in a radio access network in accordance with the present invention. In this embodiment, the output of the RF up-converter is split into N (a positive integer) number of digitally controlled phase shifters 640. Each phase shifter drives a PA buffer amplifier internal to the radio head. At the end of a coaxial line, an additional PA 644 and transmit filter 646 drive a remotely located transmit antenna. Alternatively, the PA and transmit filter can be located within the transmitter driving a local antenna. The transmitter outputs can be reconstructed in a receiver architecture such as in FIG. 6a or the distributed antenna architecture approach can be used merely to provide more coverage of a given area. In another embodiment, the output of the DAC 334 can be split into multiple up-converters which then drive phase shifters. This is done at the expense of additional hardware.

Figure 7A:
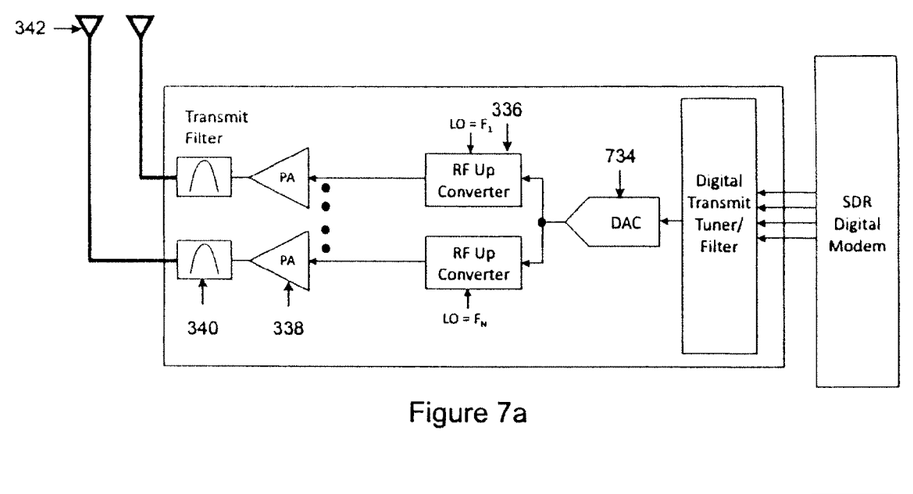
FIGS. 7a and 7b depict transmitter and receiver architectures utilizing frequency shifting.

An additional transmit beam-forming architecture is shown in FIG. 7a. Beam-forming can be accomplished through either phase or frequency shifting. The previous architectures shown for receive and transmit are based on phase shifting the signal. A second approach for digital beam-forming is frequency shifting. In FIG. 7a, the DAC 734 output signal is frequency translated in multiple up-converter paths 336 through the use of different LO frequencies into each mixer. This approach provides a frequency translated version of the input signal in multiple transmit paths. Reception of these transmitted signals can be obtained by the previously depicted receiver architectures.

Figure 7B:
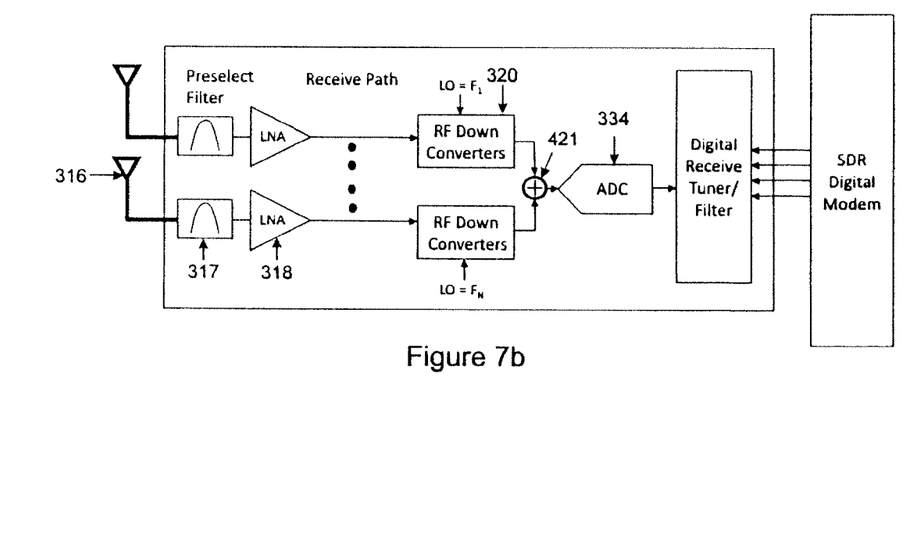

FIG. 7b depicts a frequency shifting receiver architecture corresponding to the transmitter in FIG. 7a. This architecture can be implemented with a slight modification to the architecture in FIG. 4. The change is comprised of using different LO frequencies for the RF down-converters 320. The block diagram is shown here for the sake of completeness and to provide a clear understanding of the use of the architecture in FIG. 4 for the present embodiment of a digital beam-forming receiver. This adaptation supports the concept that the architectures shown above are flexible and are driven by the system approach. The receive and transmit beam-forming architectures shown can be used in commercial applications for Multiple-In, Multiple-Out ("MIMO") transceivers for a variety of mobile device applications, as well as stationary base station and radio head applications.

The above described radio head transceiver architectures are meant to support all possible 3G/4G cell services internationally as well as Wi-Fi, and any other possible non-cellular services needed in support of possible operational modes for the transceiver unit and radio head. The transceiver can be configured as necessary to support the number of services required. The number of separate receiver channels required is based on the services that must be supported. This includes, but is not limited to, UMTS/WCDMA, EDGE, and CDMA-2000 for 3G services in the United States and TD-SCDMA in the Far East for 3G cell service. FDD and TDD cell services are supported. Full duplex and half-duplex services are supported. In the United States, 4G services include LTE FDD and LTE MIMO, and in the Far East there is also TD LTE. The architecture will scale, in terms of instantaneous achievable bandwidth, with the components available. 802.11a, b, g, n, etc. Wi-Fi services will also be supported by this architecture. In the various shown embodiments of the receiver path, each channel up to N channels, can be dedicated to a separate service, or can be shared for multiple services. The channels can all be dedicated to cellular services, or can be dedicated to cellular plus other services. The antennas and pre-select filters are tuned for particular services.

When the network detects users within the receiver range of the radio head, it then uses frequency and modulation characteristics of a device signal to determine a device's communication protocol. For example, in communications standards where users are allocated a small amount of bandwidth, the transmission frequency is indicative of both the service provider and communications protocol of the signal because each provider has licensed their own spectrum. However, in protocols like Code Division Multiple Access ("CDMA") where a broader spectrum is shared, a different technique such as reading carrier information from the unencrypted header of communicated data containing service provider identification can be used. This service provider information can also be obtained by monitoring radio waves for transmissions from external macro-network base stations. Alternatively, the existing networks in the area can be programmed into the interface gateway software at the time of installation or at a later time through a software change which can be performed locally or remotely. This information is used to configure an appropriate transmit and receive channel in the SDR software for communication with the device. Because of this adaptability, the radio head acts as a ubiquitous transceiver for different service providers and communications protocols that is transparent to the user. This overcomes a significant disadvantage present in femtocells, picocells, and DAS systems that are provider specific. For example, comparable functionality using existing femtocell technology would require at least one femtocell for each service provider to provide similar telephony capability to a radio head in accordance with the present invention. This would require nearly an order of magnitude greater number of pieces of hardware to provide the same service. Furthermore, the network of femtocells would still potentially lack some of the additional capabilities of the present radio access network described below.

Using an ingress and egress detection method the detection process begins as soon as a user enters a building. When the signal from the macro-network begins to attenuate, mobile devices increase their transmission power in order to maintain connection to the network. When this occurs, a sally port receiver detects the connection protocol and service provider of the device. The sally port receiver can be implemented using a slightly modified radio head, for example a radio head with the transmit pathway disabled. Detection of the arrival of a new mobile device into the jurisdiction of the intra-building radio network can also be achieved using directional capabilities of the radio head antenna system. Given an antenna pattern that favors the inside of the building relative to the outside, the signal strength of the mobile transmitter as received by the Radio Head will be greater when the mobile device is inside compared to immediately outside the building. This detection capability does not rely on the mobile device adjusting its transmit signal power.

This information is used to identify entering users as they are entering the building. This information is shared with the rest of the radio network, possibly in a table within the interface gateway. The interface gateway can determine whether the radio access network has available channels capable of handling the new user. The network can either reallocate idle resources to the user's protocol or place the user in a queue if none are available. If a channel is available, the appropriate radio heads establish a communication block within the SDR (See FIG. 3) capable of handling the user. The mobile radio access network then communicates with the provider network to negotiate handoff of the user. At the same time the interface gateway coordinates with the radio heads to reallocate resources as needed for other users. The communication with the user's device remains on licensed spectrum and the user is detected automatically at the sally port. Similarly, when a device user is connected to the mobile radio access network and begins exiting from the sally port, the mobile radio access network can begin negotiating handoff of the user back to the macro-network. Protocol detection in combination with the interaction between the interface gateway and the macro-networks described below allows for a seamless user experience during both ingress and egress.

The radio access network will also receive signals that originate outside of the building from the service provider macro-networks. By monitoring these signals, the radio network will be able to determine which service providers are active, the frequency bands in use, and the associated communications standards. Also, It is assumed that the timing references associated with a service provider's network have favorable characteristics. These timing references can be compared with the timing references of the radio heads and used to monitor, and calibrate, the indoor radio access network's timing performance.

In addition to attenuation of mobile radio signals, the building walls and roof often severely attenuate GPS signals and consequently mobile device location methods based on GPS do not function satisfactorily within a building. However, knowing the location of each user within a building is necessary for some mobile device applications. For example, this information can be used in coordination with the active RF power function of the radio heads to make sure that power received by the user is sufficient. Additionally, the location of a mobile device user could be used to send targeted advertisements to that user based on their proximity to a store in a shopping mall.

Figure 8A:
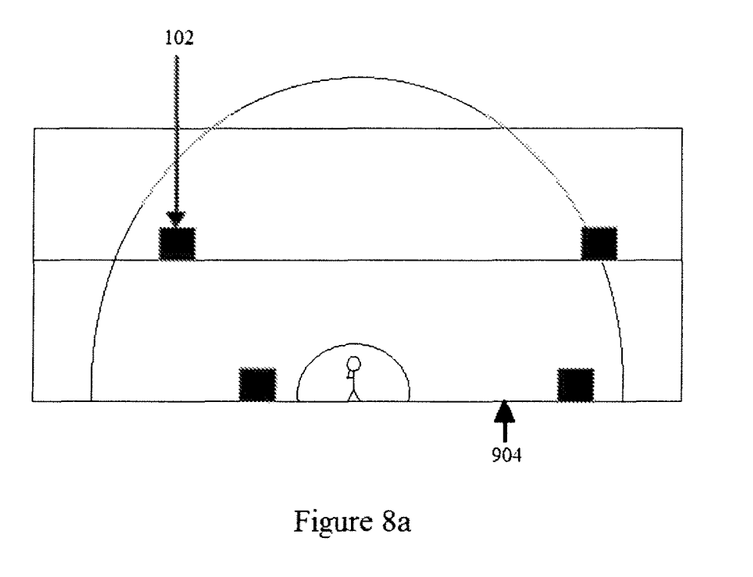
FIGS. 8a and 8b depict two different mobile device user locating techniques.
Figure 8B:
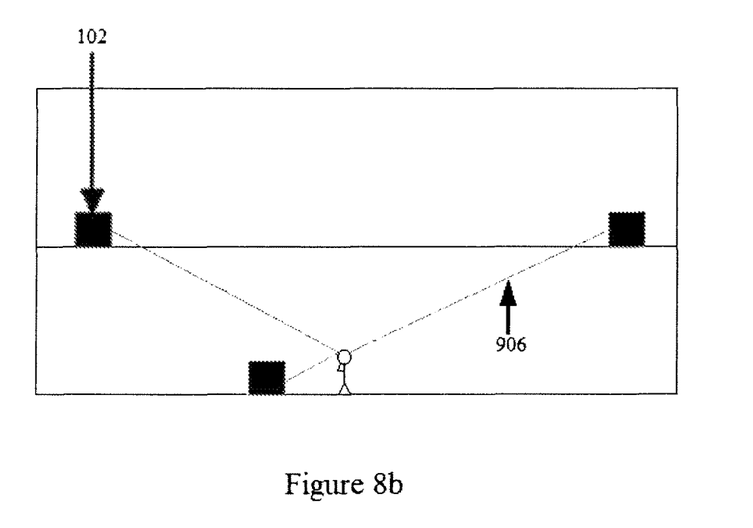

FIGS. 8a and 8b illustrate a user location detection function implemented within the radio access network using the radio heads to determine mobile device and user location. FIG. 8a shows a mobile radio access network using a relative received power to determine the location of a user. The received power level from a particular mobile device is measured by at least four different radio heads 102. Since the absolute transmitted power by the mobile device is unknown, the relative received signal strength 904 (depicted with lighter shading at increased distance from the device) at the radio heads are compared and the location of the mobile device can be estimated based on the relative distances from the radio heads. FIG. 8b shows a mobile radio access network using a time of arrival approach to locating the position of a mobile device. In this layout, radio heads 102 will look for a special signal or signal feature and create a timestamp of the signal feature arrival. Using the travel time of signals traveling through air at approximately 1 ns/ft over a distance between the device and the radio head 906, the relative position of the device is determined. In order for this method to be accurate, synchronization of the radio head timing is needed. Problems with the synchronization can also be determined by the use of additional radio heads. The approaches shown in FIGS. 8a and 8b can be used concurrently and by suitable averaging the location estimate can be improved. The position of the radio heads could potentially be programmed during radio head installation for maximum accuracy, but the techniques shown in FIGS. 8a and 8b, namely based on power measurement and time-of-arrival measurement, can also be applied for the radio heads to determine their own relative positions. As shown below in FIG. 10, sensors 1104 can monitor the transmission from the radio head(s) 102. This extra capability would allow the location measurements to remain accurate even if the radio heads are moved from the manually entered positions at installation.

These location methods are possible because of the aggregation of radio head data by the interface. A system of independent femtocells would be poorly suited to provide similar functionality because femtocells are designed to communicate directly with the service provider network. The scale of a large mobile network would make implementing this type of functionality remotely unwieldy and expensive because the network would need to know the physical location of each femtocell. Having radio head data that includes location information and including an interface gateway to manage this data reduces the task of device location to an achievable scale.

It should be noted that the location information provided does not only give latitude and longitude coordinates for each mobile device. The radio heads have floor information, allowing a user to be even more precisely located by including information about their altitude. This information is particularly useful when an emergency "911" phone call is made and the caller is unable to convey their exact location. The exact location information could be conveyed directly to emergency responders by remotely accessing the interface gateway data at a building security computer terminal. Also, it would not be difficult for a mobile service to gather the additional altitude or floor information in addition to other location information which would be relayed to emergency responders directly.

Figure 9:
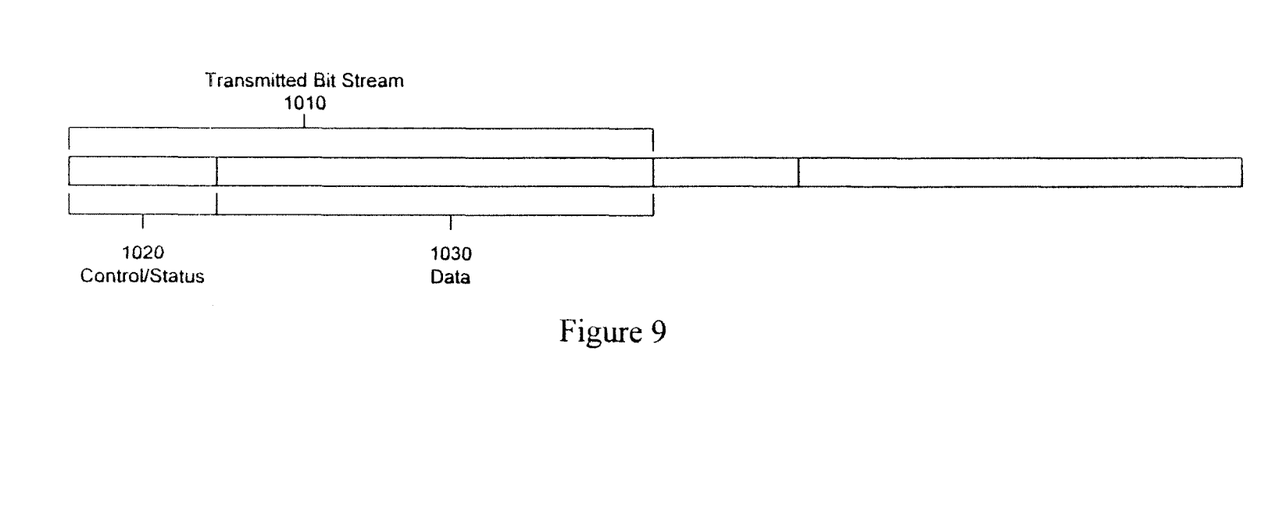
FIG. 9 depicts a data transmission structure that can be used to determine time-of-arrival information.

As depicted in FIG. 9, a mobile device transmits a data bit-stream comprising two categories of data. One category 1020 contains status and or control information including, but not limited to, the telephone identity, the power levels of the received signal from the base station, the identities of the base stations in view, and so on. The other category 1030 is the actual information such as, for example, the audio/video/data information originating at the mobile device. The control/status information is generally not encrypted but the audio/video/data information may be encrypted. Each modulation and access scheme has its particular format but the principle depicted in FIG. 9 is universal. The access scheme defines the particulars of how to identify the status/control information block from the audio/video/data information block, which together form the transmitted data 1010. Presence of an identifiable data pattern provides a suitable characteristic event that can be detected and time-stamped by the receiver.

While providing network access within the building is important to service providers, it is desirable to do so without interfering with the macro-networks outside of the building. By allowing the radio heads to determine the power level of their transmission at different locations within the building, the radio head can determine whether power levels are too high and will potentially result in interference with outside networks. Since the radio heads are capable of transmitting over multiple carrier frequencies, this operation can be performed independently for each communication protocol using the same type of chirp signal. The channel independence prevents adjustment due to high RF power levels in one channel from causing another channel's power level to go too low. However, for simplicity, power levels can instead be controlled by changing all channel power levels through a single proportional control as described below.

Figure 10:
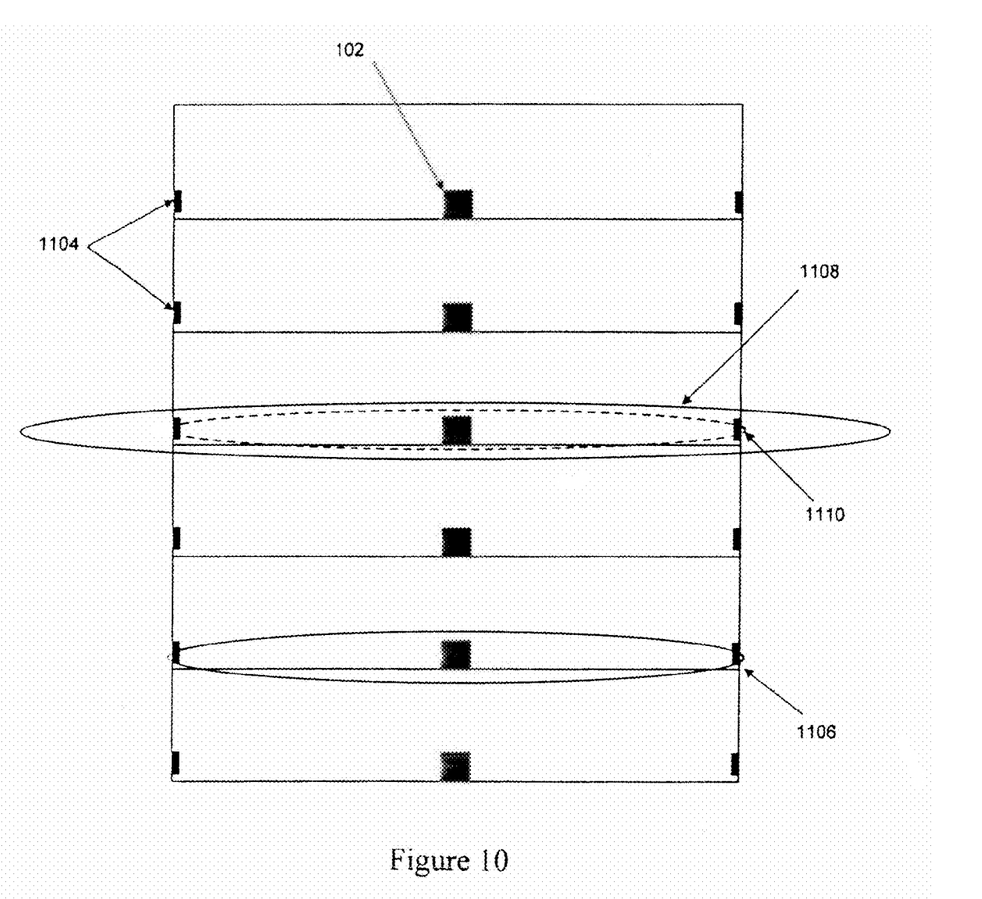
FIG. 10 depicts an implementation of an RF power management framework.

FIG. 10 illustrates a mobile network in a building and shows the result of active RF power management. Radio heads 102 are located centrally on each floor of the building. RF energy sensors 1104 can be placed around the perimeter of the building where they can detect the amount of energy coming from radio heads that might interfere with the macro-network outside of the building. The curve 1106 represents a radius from the smart radio head where the power level is within acceptable power levels for interference with the macro-network. The power level falls off at the walls of the building, and thus interference is minimal. Curve 1108 shows a power radius of a radio head that is transmitting enough power that there is potential for interference with the macro-network. The RF energy sensors 1104 detect this high power level, and communicate with interface gateway to command the radio head to reduce transmission power. The system can determine the identity of the transmitter based on the carrier frequency being used/detected and/or other identifying features such as the radio head identifier in the status/control data. Once the excessive power condition is detected, the interface gateway passes a command to the radio head to reduce transmit power. Curve 1110 shows the resulting radius of the acceptable transmit power after the adjustment.

With the measured power of each radio head in conjunction with knowing the location of each radio head, the interface gateway can determine appropriate power levels without necessarily using additional sensor components. Additional measures to prevent interference with the macro-network include the use of beam forming with multiple antenna arrays for the radio heads. The radio head antenna pattern can be formed to have its main lobe directed towards the inside of the building, away from the external macro-network area.

As an alternative to discrete sensors 1104, the radio heads 102 themselves can serve the function of determining whether transmit power will interfere with the macro-network. In this embodiment of the invention, the power management signal would need to be transmitted on a different frequency from other radio access communication in order to avoid mutual interference with the transmit signals of the receiver radio heads. In this embodiment of the invention, an out-of-band carrier frequency, such as one belonging to the ISM band, can be used. A radio head transmits a signal with a unique phase-shift analogous to a "chirp" in radar communication or has another identifying feature. The power level of the ISM band signal can be configured so that it would not interfere with other devices operating in the band. The radio head can be designed such that the power levels of the various licensed spectrum transmissions are proportional to the out-of-band signal power level by an appropriate ratio. This ratio can differ for each communication standard depending on the standard's requirements. By adjusting the out of band signal when a high power level indicates that power is escaping the building, the licensed spectrum transmission will also be adjusted to an appropriate level. The unique chirp signal for each radio head can also be used to measure a time of flight of a reflected signal to determine the direction and distance of the closest wall in a structure. Since power sent through walls is attenuated, a radio head with directional capability can be configured so that the majority of its power radiates away from the wall and provides more service area. Assigning a unique identifier to a particular radio head can be managed by the interface gateway to ensure that the identifiers are in fact unique. This type of power management scheme would not be realistic in a system of femtocells because of a lack of integration and management of the individual cells. Performing a similar task for all femtocells on a macro-network such that nearby femtocells do not mutually interfere with this or a similar type of scheme requires more information about femtocell location than mobile networks currently have or could realistically manage. The manageable scale and functionality integration of a radio access network in accordance with the present invention make this type of RF power management an achievable task.

Having thus described several embodiments of a multi-standard indoor mobile radio access network, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. An indoor mobile radio network, comprising:
a centralized device in communication with at least one service provider radio access network; and
a plurality of radio heads, each one of said plurality of radio heads being in communication with said centralized device and configured to:
communicate with a plurality of wireless devices, each one of said plurality of wireless devices having a different service provider and a different communication protocol;
receive a signal from one of said plurality of wireless devices;
use at least one of a frequency associated with said signal, a modulation associated with said signal, and information embedded in said signal to detect a service provider and a communication protocol associated with said one of said plurality of wireless devices; and
transmit at least one packet to said centralized device, said at least one packet including at least an identifier associated with said transmitting one of said plurality of radio heads, said service provider associated with said one of said plurality of wireless devices, and z-axis location information associated with said transmitting one of said plurality of radio heads;
wherein said centralized device is configured to communicate at least data associated with a z-axis of said one of said plurality of wireless devices to a remote device via said at least one service provider radio access network.

2. The indoor mobile radio network of claim 1, wherein said centralized device comprises at least a multiprotocol label switching (MPLS) router.

3. The indoor mobile radio network of claim 2, wherein said centralized device further comprises at least a interface gateway.

4. The indoor mobile radio network of claim 2, wherein said MPLS router is in communication with said plurality of radio heads via Ethernet wiring installed in a structure, said plurality of radio heads being located inside said structure, wherein at least one of said plurality of radio heads is located on a first floor of said structure, and at least one other one of said plurality of radio heads is located on a second floor of said structure.

5. The indoor mobile radio network of claim 1, wherein each one of said plurality of radio heads includes a plurality of filters, wherein each one of said plurality of filters is tuned to a different communication standard.

6. The indoor mobile radio network of claim 5, wherein each one of said plurality of radio heads includes a plurality of low noise amplifiers (LNAs), wherein each one of said plurality of LNAs is connected to a corresponding one of said plurality of filters.

7. The indoor mobile radio network of claim 6, wherein each one of said plurality of radio heads include at least one analog-to-digital (A/D) converter connected to at least one of said plurality of LNAs.

8. The indoor mobile radio network of claim 1, wherein each one of said plurality of radio heads includes at least one digital device configured to use said signal to detect said service provider and said communication protocol and transmit at least one packet to said centralized device.

9. The indoor mobile radio network of claim 8, wherein said at least one digital device includes at least one software defined radio digital modem.

10. The indoor mobile radio network of claim 9, wherein said at least one digital device further includes at least one digital tuner/filter.

11. An indoor mobile radio network, comprising:
a centralized device in communication with at least one service provider radio access network; and
a plurality of radio heads, each one of said plurality of radio heads being in communication with said centralized device and configured to:
communicate with a plurality of wireless devices, each one of said plurality of wireless devices having a different service provider and a different communication protocol;
receive a signal from one of said plurality of wireless devices;
use said signal to detect a service provider and a communication protocol associated with said one of said plurality of wireless devices; and
transmit at least one packet to said centralized device, said at least one packet including at least an identifier associated with said transmitting one of said plurality of radio heads, said service provider associated with said one of said plurality of wireless devices, and z-axis location information associated with said transmitting one of said plurality of radio heads;
wherein said centralized device is configured to communicate at least data associated with a z-axis of said one of said plurality of wireless devices to a remote device via said at least one service provider radio access network;
wherein each one of said plurality of radio heads are further configured to transmit signal strength information associated with said signal to said centralized device;
wherein said centralized device is further configured to use said signal strength information to determine whether said one of said plurality of wireless devices has entered a structure and is leaving said structure, said plurality of radio heads being located inside said structure; and
wherein said centralized device is further configured to negotiate a hand-off from a macro-network of said service provider to said indoor mobile radio network when it is determined that said one of said plurality of wireless devices has entered said structure, and negotiate a hand-off from said indoor mobile radio network to said macro-network of said service provider when it is determined that said one of said plurality of wireless devices has left said structure.

12. The indoor mobile radio network of claim 11, wherein said centralized device is further configured to use at least said signal strength information to determine said z-axis associated with said one of said plurality of wireless devices.

13. The indoor mobile radio network of claim 11, wherein said centralized device is further configured to use at least signal strength information from more than one of said plurality of radio heads to determine said z-axis associated with said one of said plurality of wireless devices.

14. The indoor mobile radio network of claim 13, wherein said centralized device is further configured to use at least said signal strength information from more than one of said plurality of radio heads to determine at least one of an x-axis and y-axis associated with said one of said plurality of wireless devices.

15. The indoor mobile radio network of claim 1, wherein each one of said plurality of radio heads are further configured to transmit signal timing information associated with said signal to said centralized device, and said centralized device is further configured to use at least said signal timing information to determine said z-axis associated with said one of said plurality of wireless devices.

16. A method for providing wireless service inside a structure, comprising:
receiving by a small-cell front end a signal from a wireless device;
using at least one of a frequency of said signal, a modulation of said signal, and information embedded in said signal to select from a plurality of known service providers a service provider associated with said wireless device;
transmitting at least one packet to a centralized device, said centralized device being in communication with a plurality of small-cell front ends located in said structure; and
communicating by said centralized device a z-axis of said wireless device to a remote device via a wide area network, at least z-axis location information associated with said small-cell front end being used to determine said z-axis of said wireless device;
wherein said at least one packet includes at least a unique identifier associated with said small-cell front end, said service provider associated with said wireless device, and said z-axis location information associated with said small-cell front end.

17. The method of claim 16, further comprising using said signal to select from a plurality of known communication protocols a communication protocol associated with said wireless device.

18. A method for providing wireless service inside a structure, comprising:
receiving by a small-cell front end a signal from a wireless device;
using said signal to select from a plurality of known service providers a service provider associated with said wireless device;
transmitting at least one packet to a centralized device, said centralized device being in communication with a plurality of small-cell front ends located in said structure;
communicating by said centralized device a z-axis of said wireless device to a remote device via a wide area network, at least z-axis location information associated with said small-cell front end being used to determine said z-axis of said wireless device;
transmitting to said centralized device a power level associated with said wireless device;
using said power level to determine whether said wireless device is inside or outside said structure; and
negotiating a hand-off from a macro-network of said service provider to a radio network associated with the centralized device when a status of said wireless device changes from outside to inside and negotiating a hand-off from said radio network associated with said centralized device to said macro-network of said service provider when said status of said wireless device changes from inside to outside;
wherein said at least one packet includes at least a unique identifier associated with said small-cell front end, said service provider associated with said wireless device, and said z-axis location information associated with said small-cell front end.

19. The method of claim 18, further comprising the step of using said power level to determine said z-axis of said wireless device.

20. The method of claim 18, further comprising the step of using said power level of said wireless device as detected by more than one small-cell front end to determine said z-axis of said wireless device.

21. The method of claim 20, further comprising the step of using said power level of said wireless device as detected by more than one small-cell front end to determine said z-axis, an x-axis and a y-axis of said wireless device.

22. A method for providing wireless service inside at least one structure, comprising:
- receiving by at least two reception devices a signal from a wireless device, said at least two reception devices being located inside said structure and on different floors of said structure;
- using said at least one of a frequency of said signal, a modulation of said signal, and information embedded within said signal to select a service provider of said wireless device from a plurality of known service providers;
- transmitting data from each one of said at least two reception devices to a routing device, said data including at least a unique identifier for each one of said at least two reception devices, said service provider of said wireless device, power levels of said wireless device as received by each one of said at least two reception devices, and z-axis location information associated with each one of said at least two reception devices;
- using said power levels of said wireless device as received by each one of said at least two reception devices to determine a z-axis of said wireless device; and
- communicating by said routing device said z-axis of said wireless device to a remote device via a network.

* * * * *